(12) United States Patent
Cavaliere et al.

(10) Patent No.: US 9,174,191 B2
(45) Date of Patent: Nov. 3, 2015

(54) OPTICAL NETWORKS

(75) Inventors: Fabio Cavaliere, Vecchiano (IT); Luca Giorgi, Ponsacco (IT); Renato Grosso, Genoa (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/391,453

(22) PCT Filed: Aug. 19, 2009

(86) PCT No.: PCT/EP2009/060738
§ 371 (c)(1),
(2), (4) Date: Feb. 21, 2012

(87) PCT Pub. No.: WO2011/020503
PCT Pub. Date: Feb. 24, 2011

(65) Prior Publication Data
US 2012/0224850 A1 Sep. 6, 2012

(51) Int. Cl.
*H04B 10/08* (2006.01)
*H04B 17/00* (2015.01)
(Continued)

(52) U.S. Cl.
CPC *B01J 19/20* (2013.01); *B01J 6/002* (2013.01); *B01J 19/28* (2013.01); *B65G 33/22* (2013.01); *C10B 7/10* (2013.01); *C10J 3/00* (2013.01); *C10J 3/005* (2013.01); *B01J 2219/182* (2013.01); *B01J 2219/187* (2013.01); *B01J 2219/1943* (2013.01); *C10J 2200/158* (2013.01);
(Continued)

(58) Field of Classification Search
None
See application file for complete search history.

(56) References Cited

U.S. PATENT DOCUMENTS

2001/0024457 A1 9/2001 Barry et al.
2004/0179855 A1 9/2004 Harada
(Continued)

FOREIGN PATENT DOCUMENTS

EP 1 892 870 2/2008
EP 1 978 653 10/2008
(Continued)

OTHER PUBLICATIONS

Demonstration of plug-and-play function by automatically controlling tunable DWDM_SFP tranceiver for coexistence-type colorless WDM-PONs (Hiro Suzuki, Masamichi) IEEE 2008.*
(Continued)

*Primary Examiner* — Daniel Dobson
*Assistant Examiner* — Mina Shalaby

(57) ABSTRACT

An optical network (10) comprising an optical network element (12) comprising a first optical transmitter (14), a first controller (16), an optical receiver (18), a second optical transmitter (22), a second controller (24) and optical receiver apparatus (26). Said first controller is arranged to control said first optical transmitter to generate and transmit a first optical signal in response no second optical signal being detected. Said first controller is arranged to iteratively generate and transmit said first optical signal at different wavelengths of a plurality of wavelengths until said second optical signal is detected, and is further arranged to subsequently maintain generation and transmission of said first optical signal at said wavelength at which said second optical signal is detected. Said second controller is arranged to control said second optical transmitter to generate and transmit said second optical signal following detection of said first optical signal by said optical receiver apparatus.

23 Claims, 8 Drawing Sheets

(51) Int. Cl.
  *H04J 14/00* (2006.01)
  *B01J 19/20* (2006.01)
  *B01J 6/00* (2006.01)
  *B01J 19/28* (2006.01)
  *B65G 33/22* (2006.01)
  *C10B 7/10* (2006.01)
  *C10J 3/00* (2006.01)

(52) U.S. Cl.
  CPC .... *C10J 2300/092* (2013.01); *C10J 2300/0916* (2013.01); *C10J 2300/0956* (2013.01); *C10J 2300/0966* (2013.01); *C10J 2300/0969* (2013.01); *C10J 2300/0986* (2013.01)

(56) References Cited

U.S. PATENT DOCUMENTS

| | | | |
|---|---|---|---|
| 2005/0013614 A1* | 1/2005 | Ota et al. | 398/67 |
| 2008/0025451 A1 | 1/2008 | Kim et al. | |
| 2008/0050115 A1 | 2/2008 | Ikai et al. | |
| 2009/0016726 A1* | 1/2009 | Suzuki et al. | 398/79 |
| 2009/0180786 A1 | 7/2009 | Arahira | |
| 2010/0158527 A1* | 6/2010 | Mizutani et al. | 398/78 |
| 2011/0211827 A1 | 9/2011 | Soto et al. | |
| 2011/0236017 A1* | 9/2011 | Ohlen | 398/34 |
| 2012/0224850 A1 | 9/2012 | Cavaliere et al. | |

FOREIGN PATENT DOCUMENTS

| | | |
|---|---|---|
| JP | 2004-274636 | 9/2004 |
| WO | WO 97/37444 | 10/1997 |
| WO | WO 2007/086514 | 8/2007 |

OTHER PUBLICATIONS

Japanese Office Action mailed Jul. 1, 2013 in Japanese Application No. 2012-525049.
Office Action dated Dec. 13, 2013 in related U.S. Appl. No. 13/391,542 (28 pages).
U.S. Appl. No. 13/391,542, filed Mar. 12, 2012; Inventor: Grosso et al.
Office Action mailed Aug. 5, 2013 in U.S. Appl. No. 13/391,542, pp. 1-30.
International Search Report for PCT/EP2009/060736 mailed May 21, 2010.
Suzuki, H et al., "Demonstration of Plug-and-Play Function by Automatically Controlling Tunable DWDM-SFP Transceiver for Coexistence-type Colorless WDM-PONs", OFC/NFOEC 2008, 2008 Optical Fiber Communication Conference/National Fiber Optic Engineers Conference IEEE Piscataway, NJ, 2008, pp. 2507-2509.
Office Action dated Jun. 19, 2014 in related U.S. Appl. No. 13/391,542 (8 pages).
International Search Report for PCT/EP2009/060738, mailed May 21, 2010.

* cited by examiner

OPTICAL NETWORKS

FIELD OF THE INVENTION

The invention relates to an optical network, an optical network element, an optical line termination, a method of configuring an optical transmitter in an optical network and a method of remotely setting a wavelength of an optical transmitter in an optical network.

BACKGROUND OF THE INVENTION

Optical network technology is moving towards providing fibre to the home utilizing wavelength division multiplexing (WDM). One particular solution for fibre to the home is wavelength division multiplexed passive optical networks (WDM-PON) in which a separate wavelength channel is used to communicate from the central office (CO) optical line termination (OLT) to the optical network unit (ONU) at each home. This approach creates a virtual point-to-point link between the CO and each ONU, in contrast to the point to multipoint topology of a regular PON. The WDM-PON network architecture requires that each ONU transmits upstream on a different wavelength. Providing each ONU with a different fixed wavelength transmitter is a costly approach and has maintenance problems associated with it. An alternative, more attractive, approach is to provide tunable lasers as the transmitters in each ONU. However, using tunable lasers at the ONUs faces the problem of tuning each laser to the correct wavelength for its associated channel.

SUMMARY OF THE INVENTION

It is an object to provide an improved optical network. It is a further object to provide an improved optical network element for an optical network. It is a further object to provide an improved optical line termination for an optical network. It is a further object to provide an improved method of configuring an optical transmitter in an optical network. It is a further object to provide an improved method of remotely setting a wavelength of an optical transmitter in an optical network.

A first aspect of the invention provides an optical network comprising an optical network element comprising a first optical transmitter, a first controller and an optical receiver. Said first optical transmitter is arranged to generate and transmit a first optical signal. Said first controller is arranged to control said first optical transmitter to generate and transmit said first optical signal at a wavelength selected from a predetermined plurality of wavelengths. Said optical receiver is arranged to detect a second optical signal. Said optical network further comprises a second optical transmitter, a second controller and optical receiver apparatus. Said second optical transmitter is arranged to generate and transmit said second optical signal. Said second controller is arranged to control said second optical transmitter to generate and transmit said second optical signal. Said optical receiver apparatus is arranged to detect an optical signal having a wavelength within a receiving wavelength band. Said first controller is arranged to control said first optical transmitter to generate and transmit said first optical signal in response to no said second optical signal being detected. That is to say, during a period when said optical receiver does not detect any second optical signal, said controller controls said first optical transmitter to generate and transmit said first optical signal. Said first controller is arranged to control said first optical transmitter to iteratively generate and transmit said first optical signal at different wavelengths of said plurality of wavelengths until said second optical signal is detected. Said first controller thus iteratively selects wavelengths from the said first plurality of wavelengths and controls said first optical transmitter to generate and transmit said first optical signal at each said selected wavelength, until said second optical signal is detected. Said first controller is further arranged to subsequently maintain generation and transmission of said first optical signal at said wavelength at which said second optical signal is detected. Said second controller is arranged to control said second optical transmitter to generate and transmit said second optical signal following detection of said first optical signal by said optical receiver apparatus. The wavelength at which said first optical signal is generated and transmitted is thus set to the last selected wavelength, being the wavelength at which said first optical signal was detected by said optical receiver apparatus, following which said second optical signal was transmitted and detected. The optical network is thus arranged to configure the wavelength of an optical transmitter at an optical network element based simply on detection of the second optical signal. The configuration of the wavelength of an optical transmitter is thus controlled at the physical layer of the network, independent of the transmission protocol, standard and bit rate used by the network. No handshake is required between the optical network element and the second optical transmitter and second controller. The second optical transmitter only generates and transmits a second optical signal following detection of the first optical signal, thereby controlling power consumption of the network.

In an embodiment, said optical receiver is provided with a first loss of signal alarm. Said optical receiver has a threshold optical power and does not detect optical signals having an optical power below said threshold optical power. Said loss of signal alarm is arranged to generate a first loss of signal alarm ON signal when no said second optical signal is detected, being when a said second optical signal is received and has an optical power below said threshold optical power or when no second optical signal is received. Said first controller is arranged to receive said first loss of signal alarm ON signal. Said first controller is arranged to cause said first optical transmitter to generate and transmit said first optical signal in response to receiving said first loss of signal alarm ON signal.

In an embodiment, said first loss of signal alarm is further arranged to generate a first loss of signal alarm OFF signal when a said second optical signal is detected, being when a said second optical signal is received and has an optical power at or above said threshold optical power. Said first controller is arranged to control said first optical transmitter to iteratively generate and transmit said first optical signal at different wavelengths of said plurality of wavelengths until a said first loss of signal alarm OFF signal is received. Said first controller thus iteratively selects wavelengths from the said first plurality of wavelengths and controls said first optical transmitter to generate and transmit said first optical signal at each said wavelength, until said second optical signal is detected and a said first loss of signal alarm OFF signal is detected. Said first controller is further arranged to subsequently maintain generation and transmission of said first optical signal at said wavelength at which said first loss of signal alarm OFF signal is received.

In an embodiment, said optical receiver apparatus is provided with a second loss of signal alarm. Said optical receiver apparatus has a threshold optical power and does not detect optical signals having an optical power below said threshold optical power. Said second loss of signal alarm is arranged to generate a second loss of signal alarm OFF signal when a said first optical signal is detected, being when a said first optical signal is received and has an optical power at or above said threshold optical power. Said second controller is arranged to receive said second loss of signal alarm OFF signal. Said second controller is arranged to control said second optical transmitter to generate and transmit said second optical signal in response to receiving said second loss of signal alarm OFF signal. Once said first optical signal is detected by said optical receiver apparatus said second loss of signal alarm OFF signal is generated, and said second optical transmitter is then controlled to generate and transmit said second optical signal.

In an embodiment, said second loss of signal alarm is further arranged to generate a second loss of signal alarm ON signal when no said first optical signal is detected, being when a said first optical signal is received and has an optical power below said threshold optical power or when no said first optical signal is received.

Loss of signal alarms are widely provided at optical receivers in optical networks. Utilising loss of signal alarms at the optical receiver and the optical receiver apparatus thus enables the optical network to detect the first and second optical signals without requiring the provision of dedicated additional hardware.

In an embodiment, said optical receiver apparatus comprises an optical detector coupled to an output port of a wavelength selective router. Said router is arranged to transmit an optical signal having a wavelength within said receiving wavelength band to said optical detector and to substantially block an optical signal having a wavelength outside said receiving wavelength band. The optical network is thus arranged to configure the wavelength of the first optical transmitter according to the output port to which the optical detector is coupled. In an embodiment, said wavelength selective router comprises a wavelength division multiplexer/demultiplexer. In an embodiment, said receiving wavelength band covers a spectral range which includes the wavelength of only one channel on a wavelength division multiplexed channel grid, and thus only one channel within said optical network. The optical network is thus arranged to configure the wavelength of the first optical transmitter to the wavelength channel of the output port to which the optical detector is coupled.

In an embodiment, said wavelength division multiplexer/demultiplexer comprises an arrayed waveguide grating. Said output port is arranged to transmit an optical signal having a wavelength within said receiving wavelength band. Optical signals having a wavelength outside said receiving wavelength band are substantially attenuated. In an embodiment, said arrayed waveguide grating comprises a cyclic arrayed waveguide grating.

In an embodiment, said optical detector has a sensitivity threshold which is higher than a maximum adjacent crosstalk of said output port. Optical signals resulting from cross-talk from other output ports of the arrayed waveguide grating are therefore not detected. In an embodiment, said first optical transmitter is arranged to generate and transmit a first optical signal having an optical power which is not greater than a difference between said sensitivity threshold and an attenuation experienced by said first optical signal. This ensures that the second optical signal will only be detected when its wavelength falls within the receiving wavelength band. Said optical detector therefore will not detect an optical signal outside said receiving wavelength band and will not detect crosstalk optical signals at a wavelength within said receiving wavelength band which are being routed to a different output port.

In an embodiment, said first optical transmitter comprises a wavelength tuneable optical source, such as a wavelength tuneable laser.

In an embodiment, said first controller is further arranged to control said first optical transmitter to generate and transmit said first optical signal in response to a control signal. Generation and transmission of said first optical signal can thus be controlled to commence following receipt of a control signal, if no second optical signal is detected.

In an embodiment, said second optical transmitter comprises an optical source having a substantially fixed operating wavelength. In an alternative embodiment, said second optical transmitter comprises a wavelength tuneable optical source, such as a wavelength tuneable laser. In an embodiment, a wavelength of said tuneable optical source is selected from a second predetermined plurality of wavelengths. In an embodiment, said second controller is arranged to provide said second predetermined plurality of wavelengths within a look-up table or look-up list from which said wavelength is selected. In an embodiment, said first predetermined plurality of wavelengths comprises wavelengths within a first wavelength band and said second predetermined plurality of wavelengths comprises wavelengths within a second wavelength band. Said second wavelength band is spaced from said first wavelength band.

In an embodiment, said optical receiver comprises a wideband optical receiver.

In an embodiment, said optical network comprises a plurality of said optical network elements, a said plurality of second optical transmitters, and a said plurality of said optical detectors. Said wavelength selective router has a plurality of output ports and said optical detectors are each coupled to a respective said port. Each said output port is arranged to transmit an optical signal having a wavelength within a different receiving wavelength band. Each said optical detector is thus arranged to detect an optical signal having a wavelength within a different channel of the network.

In an embodiment, said plurality of said optical network elements are connected to said wavelength selective router via a second wavelength selective router each said optical network element being connected to a different one of a plurality of input ports. In an embodiment, said second wavelength selective router comprises a wavelength division multiplexer/demultiplexer, each said optical network element being connected to a different one of a plurality of input/output ports of said wavelength division multiplexer/demultiplexer. In an embodiment, said wavelength division multiplexer comprises an arrayed waveguide grating. The optical network is thus arranged to configure the wavelength of each said first optical transmitter according to the respective said input/output port of said wavelength division multiplexer/demultiplexer to which said first optical transmitter is coupled, and thus according to the channel of the network to which each said first optical transmitter is allocated.

In an embodiment, said arrayed waveguide grating comprises a cyclic arrayed waveguide grating.

In an embodiment, said second predetermined plurality of wavelengths comprises a different wavelength associated with each said output port. Said wavelength for the or each said second optical transmitter is thus set according to which said output port said second optical transmitter is coupled to.

In an embodiment, said optical network further comprises an optical link provided between the or each said optical network element and said wavelength selective router, and the or each said optical network element is located remotely from the or each said optical detector. In an embodiment, said wavelength division multiplexer/demultiplexer is located remotely from said wavelength selective router.

A second aspect of the invention provides an optical network element comprising an optical transmitter, a controller and an optical receiver. Said optical transmitter is arranged to generate and transmit a first optical signal. Said controller is arranged to control said optical transmitter to generate and transmit said first optical signal at a wavelength selected from a predetermined plurality of wavelengths. Said optical receiver is arranged to detect a second optical signal. Said controller is arranged to control said optical transmitter to generate and transmit said first optical signal in response to no said second optical signal being detected. That is to say, during a period when said optical receiver does not detect any second optical signal, said controller controls said optical transmitter to generate and transmit said first optical signal. Said controller is arranged to control said optical transmitter to iteratively generate and transmit said first optical signal format different wavelengths of said plurality of wavelengths until said second optical signal is detected. Said controller thus iteratively selects wavelengths from the said plurality of wavelengths and causes said optical transmitter to generate and transmit said first optical signal at each said wavelength, until said second optical signal is detected. Said controller is further arranged to subsequently maintain generation and transmission of said first optical signal at said wavelength at which said second optical signal is detected.

The optical network element is thus arranged to configure the wavelength of the optical transmitter at an optical network element based simply on detection of the second optical signal. The configuration of the wavelength of the optical transmitter can thus controlled at the physical layer of an optical network in which the optical network element is provided, independent of the transmission protocol, standard and bit rate used by the network.

In an embodiment, said optical receiver is provided with a first loss of signal alarm. Said optical receiver has a threshold optical power and does not detect optical signals having an optical power below said threshold optical power. Said loss of signal alarm is arranged to generate a first loss of signal alarm ON signal when no said second optical signal is detected, being when a said second optical signal is received and has an optical power below said threshold optical power or when no second optical signal is detected. Said controller is arranged to receive said loss of signal alarm ON signal. Said controller is arranged to cause said optical transmitter to generate and transmit said first optical signal in response to receiving said loss of signal alarm ON signal.

In an embodiment, said first loss of signal alarm is further arranged to generate a first loss of signal alarm OFF signal when a said second optical signal is detected, being when a said second optical signal is received and has an optical power at or above said threshold optical power. Said controller is arranged to control said optical transmitter to iteratively generate and transmit said first optical signal at different wavelengths of said plurality of wavelengths until a said first loss of signal alarm OFF signal is received. Said controller thus iteratively selects wavelengths from the said first plurality of wavelengths and controls said optical transmitter to generate and transmit said first optical signal at each said wavelength, until said second optical signal is detected and a said first loss of signal alarm OFF signal is detected. Said controller is further arranged to subsequently maintain generation and transmission of said first optical signal at said wavelength at which said loss of signal alarm OFF signal is received.

Loss of signal alarms are widely provided at optical receivers. Utilising a loss of signal alarm at the optical receiver thus enables the optical network element to detect the second optical signal without requiring the provision of dedicated additional hardware.

In an embodiment, said optical transmitter comprises a wavelength tuneable optical source, such as a wavelength tuneable laser.

In an embodiment, said controller is further arranged to control said optical transmitter to generate and transmit said first optical signal in response to a control signal. Generation and transmission of said first optical signal thus commences following receipt of a control signal, if no second optical signal is detected.

In an embodiment, said optical receiver comprises a wideband optical receiver.

A third aspect of the invention provides an optical line termination comprising an optical transmitter, a controller and optical receiver apparatus. Said optical transmitter is arranged to generate and transmit a second optical signal. Said optical receiver apparatus is arranged to detect a first optical signal having a wavelength within a receiving wavelength band. Said controller is arranged to control said optical transmitter to generate and transmit said second optical signal following detection of said first optical signal by said optical receiver apparatus.

The optical line termination is thus arranged to control generation and transmission of the second optical signal based simply on detection of the first optical signal. The operation of the optical transmitter can thus controlled at the physical layer of a network in which the optical line termination is provided, independent of the transmission protocol, standard and bit rate used by the network. The optical transmitter only generates and transmits a second optical signal following detection of the first optical signal, thereby controlling power consumption of the optical line termination.

In an embodiment, said optical receiver apparatus is provided with a loss of signal alarm. Said optical receiver apparatus has a threshold optical power and does not detect optical signals having an optical power below said threshold optical power. Said loss of signal alarm is arranged to generate a loss of signal alarm OFF signal when a said first optical signal is detected, being when a said first optical signal is received and has an optical power at or above said threshold optical power. Said controller is arranged to receive said loss of signal alarm OFF signal. Said controller is arranged to control said optical transmitter to generate and transmit said second optical signal in response to receiving said loss of signal alarm OFF signal. Once said first optical signal is detected by said optical receiver apparatus said loss of signal alarm OFF signal is generated, and said optical transmitter is then controlled to generate and transmit said second optical signal.

In an embodiment, said loss of signal alarm is further arranged to generate a loss of signal alarm ON signal when no said first optical signal is detected, being when a said second optical signal is received and has an optical power below said threshold optical power or when no said first optical signal is received.

In an embodiment, said optical receiver apparatus comprises an optical detector coupled to an output port of a wavelength selective router. Said router is arranged to transmit an optical signal having a wavelength within said receiving wavelength band to said optical detector and to substantially block an optical signal having a wavelength outside said receiving wavelength band. In an embodiment, said wavelength selective router comprises a wavelength division multiplexer/demultiplexer.

In an embodiment, said wavelength division multiplexer/demultiplexer comprises an arrayed waveguide grating. Said output port is arranged to transmit an optical signal having a wavelength within said receiving wavelength band. Optical signals having a wavelength outside said receiving wavelength band are substantially attenuated. In an embodiment, said arrayed waveguide grating comprises a cyclic arrayed waveguide grating.

In an embodiment, said optical detector has a sensitivity threshold which is higher than a maximum adjacent crosstalk of said output port. Optical signals resulting from cross-talk from other output ports of the arrayed waveguide grating are therefore not detected. Said optical detector therefore will not detect said first optical signal outside said receiving wavelength band and will not detect crosstalk optical signals at a wavelength within said receiving wavelength band which are being routed to a different output port.

In an embodiment, said optical transmitter comprises an optical source having a substantially fixed operating wavelength. In an alternative embodiment, said optical transmitter comprises a wavelength tuneable optical source, such as a wavelength tuneable laser. In an embodiment, a wavelength of said tuneable optical source is selected from a predetermined plurality of wavelengths. In an embodiment, said controller is arranged to provide said predetermined plurality of wavelengths within a look-up table or look-up list from which said wavelength is selected.

A fourth aspect of the invention provides a method of configuring an optical transmitter in an optical network. The method comprises, at a first network location, determining whether a first optical signal is present and has a wavelength within a receiving wavelength band. When said first optical signal is present and has a wavelength within said receiving wavelength band, the method comprises generating and transmitting a second optical signal. The method further comprises, at a second network location, at which said optical transmitter is located, iteratively generating and transmitting said first optical signal at different wavelengths of a predetermined plurality of wavelengths until said second optical signal is determined to be present. Therefore, during a period when said second optical signal is determined to be absent, said first optical signal is iteratively generated and transmitted at different wavelengths selected from said plurality of wavelengths. When said second optical signal is determined to be present, said method comprises subsequently maintaining generation and transmission of said first optical signal at said wavelength at which said second optical signal is so determined to be present. A presence of said second optical signal thus causes the iterative generation and transmission of said first optical signal at different wavelengths of said predetermined plurality of wavelengths to halt.

The method thereby configures the wavelength of an optical transmitter at an optical network element based simply on detection of the second optical signal. The configuration of the wavelength of an optical transmitter is thus controlled just utilizing the physical layer of the network in which the method is used, independent of the transmission protocol, standard and bit rate used by the network. No handshake is required between the optical network element and the second optical transmitter and second controller. The method ensures that the second optical transmitter only generates and transmits a second optical signal following detection of the first optical signal, thereby controlling power consumption of the network in which the method is applied.

In an embodiment, said step of determining whether said first optical signal is present and has a wavelength within said receiving wavelength band comprises receiving a first loss of signal alarm signal and determining whether said first loss of signal alarm signal is a loss of signal alarm OFF signal indicative that said first optical signal is present, being when a said first optical signal is received and has an optical power at or above a threshold optical power. In an embodiment, said step of determining whether said second optical signal is present comprises receiving a second loss of signal alarm signal and determining whether said second loss of signal alarm signal is a loss of signal alarm ON signal indicative that said second optical signal is not present. In an embodiment, said step of determining whether said second optical signal is present comprises determining whether said second loss of signal alarm signal is a loss of signal alarm OFF signal indicative that said second optical signal is present. Said loss of signal alarm signal can thus indicate that a second loss of signal alarm is in an ON condition or in an OFF condition, depending on whether said second optical signal is present or is absent.

The method thus enables the optical network element to detect the second optical signal without requiring the provision of dedicated additional hardware, since loss of signal alarms are widely provided within optical receivers.

In an embodiment, said first optical signal is determined as being present if said first optical signal is received and has an optical power equal to or greater than a detector sensitivity threshold.

In an embodiment, said second optical signal has an optical power which is not greater than the difference between said detector sensitivity threshold and an attenuation experienced by said second optical signal on transmission across said network.

A fifth aspect of the invention provides a method of remotely setting a wavelength of an optical transmitter in an optical network. The method comprises, at a location remote from said optical transmitter, determining whether a first optical signal generated by said optical transmitter is present and has a wavelength within a receiving wavelength band. The method further comprises, when said first optical signal is present and has a wavelength within said receiving wavelength band, generating and transmitting a second optical signal.

The method thereby remotely sets the wavelength of an optical transmitter in an optical network based simply on detection of the presence of the second optical signal. Setting the wavelength of an optical transmitter is thus controlled just utilizing the physical layer of the network in which the method is applied, independent of the transmission protocol, standard and bit rate used by the network. The method ensures that the optical transmitter only generates and transmits a second optical signal following detection of the first optical signal, thereby controlling power consumption of the network in which the method is applied.

In an embodiment, said step of determining whether said first optical signal is present and has a wavelength within said receiving wavelength band comprises receiving a loss of signal alarm OFF signal indicative that said first optical signal is received and has an optical power at or above a threshold optical power.

In an embodiment, said first optical signal is determined as being present if said first optical signal has an optical power equal to or greater than a detector sensitivity threshold.

A sixth aspect of the invention provides a method of remotely setting a wavelength of an optical transmitter in an optical network. The method comprises at said optical transmitter, iteratively generating and transmitting a first optical signal at different wavelengths of a predetermined plurality of wavelengths until a second optical signal is determined to be present. Said second optical signal is received from a location remote from said optical transmitter. When said second optical signal is determined to be present, said method comprises subsequently maintaining generation and transmission of said first optical signal at said wavelength at which said second optical signal is so determined to be present. A presence of said second optical signal thus causes the iterative generation and transmission of said first optical signal at different wavelengths of said predetermined plurality of wavelengths to halt.

The method thereby remotely sets the wavelength of an optical transmitter in an optical network based simply on detection of the presence of the second optical signal. Setting the wavelength of an optical transmitter can thus be controlled just utilizing the physical layer of the network in which the method is used, independent of the transmission protocol, standard and bit rate used by the network.

In an embodiment, said step of determining whether said second optical signal is present comprises receiving a loss of signal alarm signal and determining whether said loss of signal alarm signal is a loss of signal alarm ON signal indicative that said second optical signal is not present. In an embodiment, said step of determining whether said second optical signal is present comprises determining whether said loss of signal alarm signal comprises a loss of signal alarm OFF signal indicative that said second optical signal is present. A seventh aspect of the invention provides a data carrier having computer readable instructions embodied therein. The said computer readable instructions are for providing access to resources available on a processor. The computer readable instructions comprise instructions to cause the processor to perform any of the above steps of the method of remotely setting a wavelength of an optical transmitter in an optical network.

An eighth aspect of the invention provides a data carrier having computer readable instructions embodied therein. The said computer readable instructions are for providing access to resources available on a processor. The computer readable instructions comprise instructions to cause the processor to perform any of the above steps of the method of configuring an optical transmitter in an optical network.

DESCRIPTION OF EMBODIMENTS OF THE INVENTION

Figure 1:
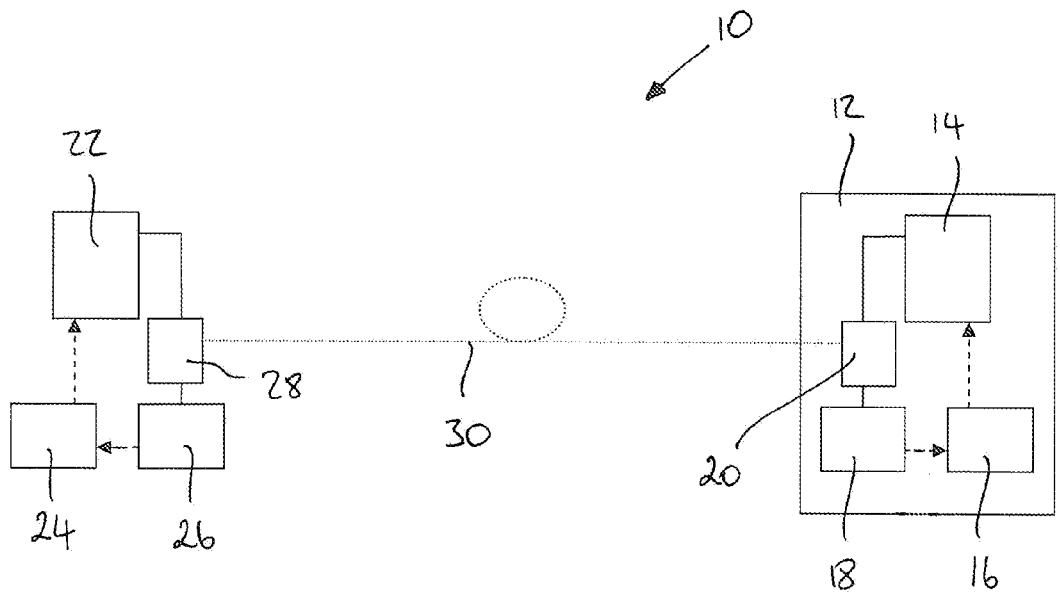
FIG. 1 is a schematic representation of an optical network according to a first embodiment of the invention.

Referring to FIG. 1, a first embodiment of the invention provides an optical network 10 comprising an optical network element 12. The optical network element 12 comprises a first optical transmitter 14, a first controller 16 and an optical receiver 18.

The optical network element 12 will typically be connected to an optical link 30, which is shown for reasons of clarity but which does not form part of this embodiment of the invention. The optical network element 12 further comprises a band-split filter 20 by which the optical link 30 is coupled to the first optical transmitter 14 and to the optical receiver 18.

The first optical transmitter 14 is arranged to generate and transmit a first optical signal. The first controller 16 is arranged to control the first optical transmitter 14 to generate and transmit the first optical signal at a wavelength selected from a pre-determined plurality of wavelengths, being the wavelengths of channels of the optical network 10. The optical receiver 18 is arranged to detect a second optical signal.

The optical network 10 further comprises a second optical transmitter 22, a second controller 24 and optical receiver apparatus 26. A second band-split filter 28 is provided to couple the optical link 30 to the second optical transmitter 22 and the optical receiver apparatus 26.

The second optical transmitter 22 is arranged to generate and transmit a second optical signal. The second controller 24 is arranged to control the second optical transmitter to generate and transmit the second optical signal. The optical receiver apparatus 26 is arranged to detect an optical signal having a wavelength within a receiving wavelength band. The receiving wavelength band covers a pre-determined range of wavelengths and typically will include the wavelengths of only one channel of the optical network 10. The second controller 26 is arranged to control the second optical transmitter 22 to generate and transmit the second optical signal following detection of the first optical signal by the optical receiver apparatus 26.

The first controller 16 is arranged to control the first optical transmitter 14 to generate and transmit the first optical signal in response no second optical signal being detected. That is to say, the first controller 16 controls the first optical transmitter 14 to generate and transmit the first optical signal when no second optical signal is detected by the optical receiver 18. The first controller 16 is arranged to iteratively generate and transmit the first optical signal at different wavelengths of the plurality of wavelengths until the second optical signal is detected at the optical receiver 18. During a period where the second optical signal is not detected at the optical receiver 18, the first controller 16 therefore controls the first optical transmitter 14 to generate and transmit a first optical signal at a first wavelength of the pre-determined plurality of wavelengths. The first optical transmitter 14 continues to generate and transmit the first optical signal at the first selected wavelength for a time period long enough to allow the first optical signal to be transmitted across the optical link 30 to the optical receiver apparatus 26, and for any resulting second optical signal to be generated and transmitted by the second optical transmitter 22 and transmitted back across the optical link 30 to the optical network element 12 and the optical detector 18. If the wavelength of the first optical signal does not fall within the receiving wavelength band of the optical receiver apparatus 26, the first optical signal is not detected by the optical receiver apparatus 26.

If the first optical signal is not detected by the optical receiver apparatus 26, the second controller 24 will not control the second optical transmitter 22 to generate and transmit the second optical signal. Therefore, a second optical signal will not be detected by the optical receiver 18. Following the lapse of the required time period for upstream transmission of the first optical signal and downstream transmission of any resulting second optical signal, if the second optical signal is not detected by the optical receiver 18 then the first controller 16 controls the first optical transmitter 14 to generate and transmit the first optical signal at a second wavelength of the pre-determined plurality of wavelengths. The first controller 16 iteratively controls the first optical transmitter 14 to generate and transmit the first optical signal at different ones of the pre-determined plurality of wavelengths until the second optical signal is detected.

The first controller 16 is further arranged to subsequently maintain generation and transmission of the first optical signal at the wavelength at which the second optical signal is ultimately detected.

The optical network 10 is thus arranged to configure the wavelength of the first optical transmitter 14 by iteratively generating and transmitting at each of a pre-determined plurality of wavelengths to see if they fall within the receiving wavelength band of the optical receiver apparatus 26, and when the "correct" wavelength is reached for the first optical signal the second controller 24 controls the second optical transmitter 22 to generate and transmit the second optical signal. Detection of the second optical signal by the optical receiver 18 causes the first controller 16 to maintain generation and transmission of the first optical signal at the last attempted wavelength.

The optical network 10 is thus arranged to configure the wavelength of the first optical transmitter 14 based simply on detection of the second optical signal, which only occurs when the first optical signal is of the correct wavelength and is detected by the optical receiver apparatus 26. The configuration of the wavelength of the first optical transmitter 14 is thus controlled at the physical layer of the network 10, and is independent of the transmission protocol, standard and bit rate used by the network 10. No handshake is required between the optical network element 12 and the second controller 24 or second optical transmitter 22. The optical network 10 also provides the advantage that the second optical transmitter 22 only generates and transmits a second optical signal following detection of the first optical signal, and will therefore also not transmit a second optical signal if the first optical transmitter 14 is off and is not transmitting, thereby controlling power consumption of the optical network 10.

Figure 2:
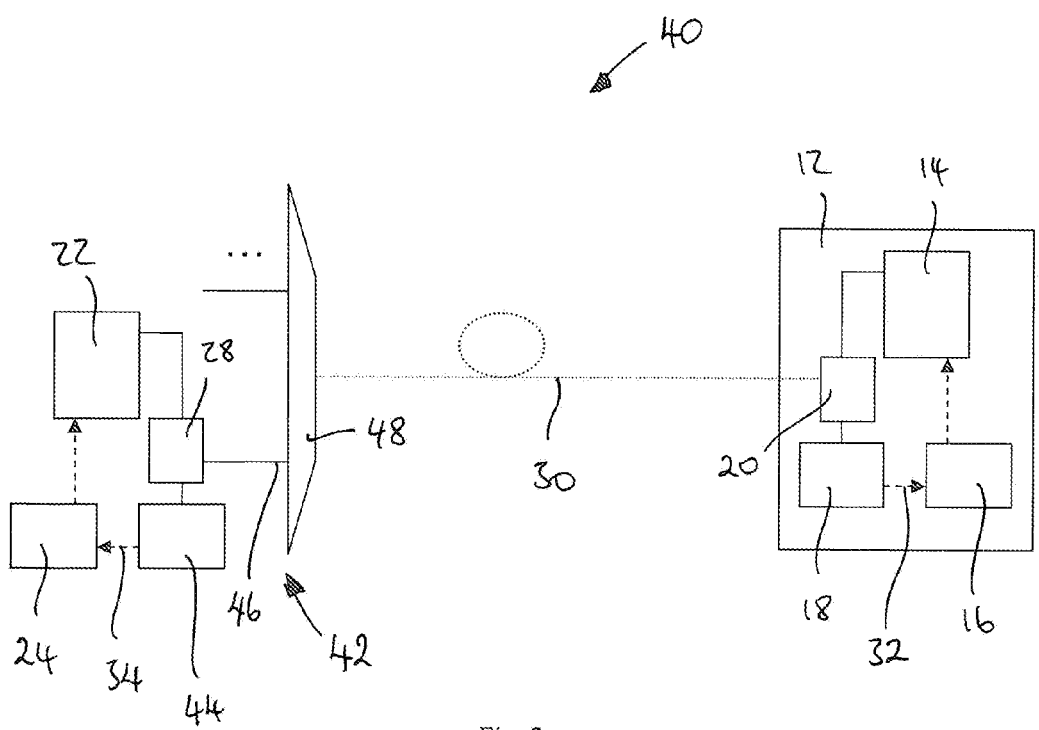
FIG. 2 is a schematic representation of an optical network according to a second embodiment of the invention.

A second embodiment of the invention, shown in FIG. 2, provides an optical network 40 which is substantially the same as the optical network 10 of the previous embodiment, with the following modifications. The same reference numbers are retained for corresponding features.

In this embodiment, the optical receiver apparatus 42 comprises an optical detector 44 coupled to an output port 46 of a wavelength selective router 48. The output port 46 is coupled to the optical detector 44 via the band-split filter 28. The wavelength selective router 48 is coupled, on its input side, to the optical link 30. As before, the optical link 30 is shown only for clarity and does not form part of this embodiment.

The first optical transmitter 14 comprises a wavelength tuneable laser and the second optical transmitter 22 comprises a fixed wavelength laser. Each of the optical receiver 18 and the optical detector 44 comprise wide band photodetectors.

In this example, the wavelength selective router 48 comprises an arrayed waveguide grating (AWG). As will be well known to the person skilled in the art, AWGs experience some cross-talk between their various channels/ports caused by optical signals on one channel leaking into adjacent channels, and thus arriving at the wrong output port of the AWG. Although AWGs are able to almost completely cancel out of band wavelengths, being wavelengths outside the receiving wavelength band of a particular channel, some cross-talk will nevertheless exist between channels of an AWG. In this example, the AWG 48 is designed to have a maximum adjacent cross-talk of −31 db, i.e. a cross-talk signal or a signal at the wrong wavelength for a channel will experience an attenuation of −31 db on transmission through the AWG, so the maximum cross-talk power of an optical signal leaking from one channel to an adjacent channel will be −31 db of its in channel power. The output port 46 of the AWG 48 is arranged to transmit an optical signal having a wavelength within a receiving wavelength band of the optical detector 44. That is to say, the output port 46 is arranged to transmit wavelengths corresponding to a single channel of a WDM grid, being a single channel of the optical network 40.

The optical detector 44 has a sensitivity threshold, being a minimum optical power below which the optical detector 44 will not detect received optical signals. In this example the sensitivity threshold of the optical detector 44 is −28 dBm. The sensitivity of the optical detector 44 is selected to be higher than the maximum adjacent cross-talk power of the output port 46, which in this example would typically be approximately −60 dBm, so that even where cross-talk signals do appear at the output port 46, the detector 44 will not detect these signals. This ensures that the detector 44 only detects a first optical signal of the correct wavelength, i.e. one falling within the receiving wavelength band of the optical detector 44.

In this embodiment, the optical receiver 18 is provided with a first loss of signal alarm. The optical receiver 18 has a threshold optical power (sensitivity threshold) below which it does not detect optical signals. The loss of signal alarm is arranged to generate a first loss of signal alarm ON signal 32 when no second optical signal is detected. That is to say, when a second optical signal is received but has an optical power below the sensitivity threshold of the optical receiver, or when no second optical signal is received at the optical receiver 18. The first controller 16 is arranged to receive the first loss of signal alarm ON signal 32 and is arranged to control the first optical transmitter 14 to generate and transmit the first optical signal in response to receiving the first loss of signal alarm ON signal 32. The first loss of signal alarm is further arranged to generate a first loss of signal alarm OFF signal 32 when a second optical signal is detected, being when a second optical signal is received and has an optical power at or above the sensitivity threshold of the optical receiver 18.

In this embodiment, the first controller 16 is arranged to control the first optical transmitter 14 to iteratively generate and transmit the first optical signal at different wavelengths of the plurality of wavelengths until the first loss of signal alarm OFF signal is received. The first controller 16 is arranged to subsequently maintain generation and transmission of the first optical signal at the wavelength at which the first loss of signal alarm OFF signal 32 is received.

It will be appreciated that the first controller 16 applies a time delay between each iterative generation and transmission of the first optical signal, to allow time for any resulting second optical signal to be transmitted across the optical link 30 and to be detected by the optical receiver 18.

The optical detector 44 is provided with the second loss of signal alarm. The second loss of signal alarm is arranged to generate a second loss of signal alarm OFF signal 34 when the first optical signal is detected. That is to say, when the first optical signal is received at the optical detector 44 and has an optical power at or above the sensitivity threshold of the optical detector 44. The second controller 24 is arranged to receive the second loss of signal alarm OFF signal 34 and to control the second optical transmitter 22 to generate and transmit the second optical signal in response to receiving the second loss of signal alarm OFF signal.

In this example, the first optical transmitter 14 is arranged to generate and transmit a first optical signal having an optical power which is not greater than a difference between the sensitivity threshold of the optical detector 44 and the attenuation experienced by the first optical signal on upstream transmission. In this example the first optical signal has an optical power of 3 dBm. Attenuation (typically up to −30 db) on transmission across the optical link 30 will result in the first optical signal having an optical power of less than 3 dBm but greater than −28 dBm at the optical detector 44, which is higher than the sensitivity threshold and so the first optical signal is detected if it falls within the receiving wavelength band of the output port 46 of the AWG 48. If the first optical signal has a wavelength outside the receiving wavelength band, the first optical signal will experience attenuation of −31 dB on transmission through the AWG 48 and will therefore have an optical power lower than the −28 dBm sensitivity threshold of the optical detector 44.

Figure 3:
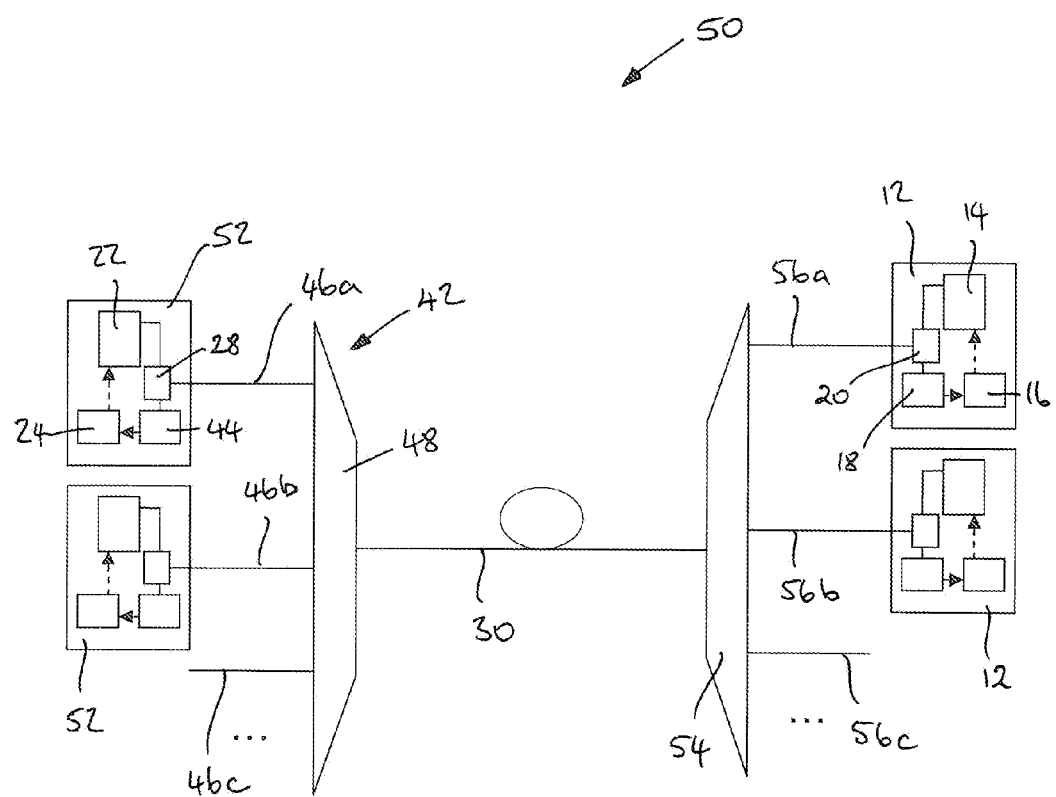
FIG. 3 is a schematic representation of an optical network according to a third embodiment of the invention.

Referring to FIG. 3, a third embodiment of the invention provides an optical network 50 which is substantially the same as the optical network 40 of the previous embodiment, with the following modifications. The same reference numbers are retained for corresponding features.

In this embodiment, the optical network 50 comprises a plurality of optical network elements 12, each coupled to the optical link 30 via a second wavelength selective router 54, which in this example comprises a second AWG. Each optical network element 12 is connected to a respective output port 56a, 56b, 56c of the AWG 54.

Figure 4:
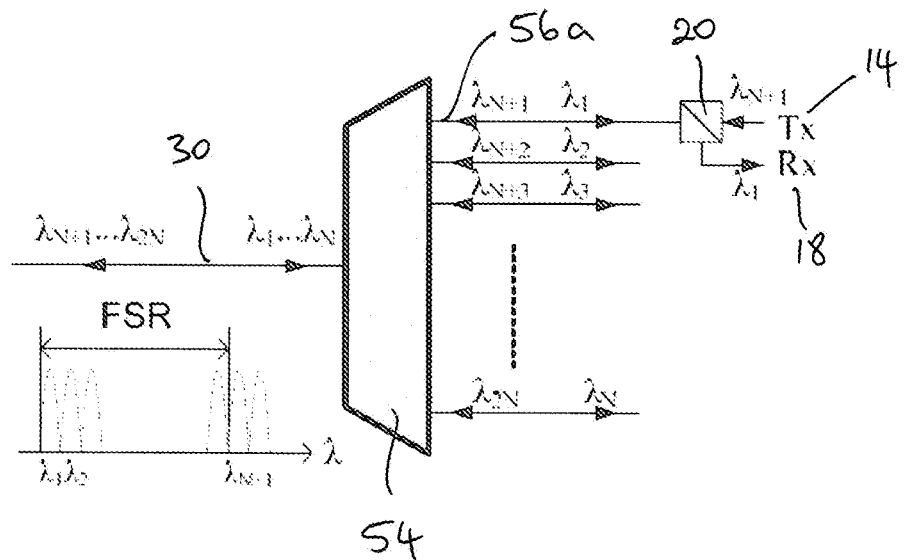
FIG. 4 is a schematic representation of a cyclic arrayed waveguide grating of the optical network of FIG. 3.

As shown in FIG. 4, the AWG 54 is a cyclic AWG, a first wavelength range, λ1, λ2 to λN being used for downstream optical signals, i.e. the optical signals from the respective second optical transmitters 22, and a second wavelength range, λN+1 to λ2N, being used for upstream optical signals, namely the first optical signals. The two wavelength ranges are separated by the free spectral range (FSR) of the AWG 54. The AWG 48 is similarly a cyclic AWG.

The optical network 50 further comprises a plurality of optical line terminations 52, each comprising a second optical transmitter 22, second controller 24, optical detector 44 and band-split filter 28, as described above in FIG. 2. Each OLT 52 is coupled to a respective input port 46a, 46b, 46c of the AWG 48.

The optical detector 44 of each OLT 52 has a receiving wavelength band covering a different range of wavelengths, so that each optical detector 44, and thus each OLT 52, is arranged to detect first optical signals relating to a different channel of the optical network 50.

The operation of the optical network elements 12 is as described above, with each first optical transmitter 14 iteratively generating and transmitting first optical signals until they are detected by the respective optical detector 44 of their respective OLT 52, causing the respective second optical transmitter 22 to generate and transmit a respective second optical signal, as described above.

Figure 5:
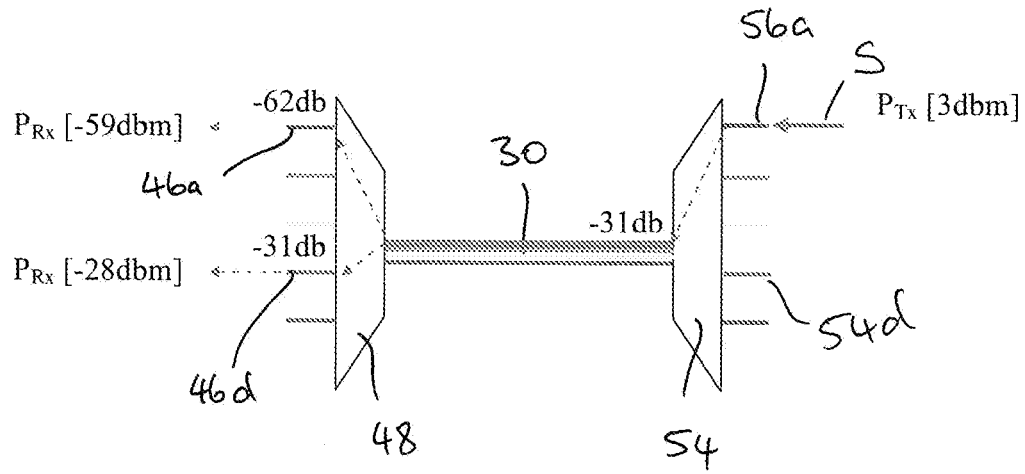
FIG. 5 is a schematic representation of the cyclic arrayed waveguide gratings and optical link of FIG. 3.

As shown in FIG. 5, a first optical signal (S) having, for example a red wavelength and an optical power of 3 dBm, incorrectly routed through a first, for example blue, port 56a of the AWG 54 will suffer an attenuation of −31 dB on transmission through the AWG 54. Including some attenuation on transmission across the optical link 30, this results in the optical signal having an optical power of below −28 dBm at an output port 46d at the AWG 48, being a red port, i.e. when the optical signal is of the correct wavelength for that output port 46d. This is below the sensitivity threshold of the detector 44 at the port 46d and so will not be detected. Any cross-talk optical signal arriving at a blue port, say 46a, will experience a further −31 dB of attenuation on transmission through the AWG 48 due to it being of the incorrect wavelength for that port, resulting in an output power of −59 dBm or lower. If the second optical signal (S) was instead routed through a red port, 54d, of the AWG 54 it will not experience any attenuation on transmission through the AWG 54. On transmission through the AWG 48 to the red port 46d it will similarly experience no attenuation, so will have an optical power of 3 dBm less the attenuation caused by transmission across the optical link 30. Any cross-talk optical signal arriving at the blue port 46a of the AWG 48 will experience −31 dB of attenuation on transmission through the AWG 48 plus attenuation across the optical link 30 and will have a resulting optical power of less than −28 dBm. A red second optical signal routed through red ports 54d, 46d will therefore arrive at the optical detector 44 having a power of 3 dBm (less any power loss due to attenuation across the optical link 30) and will thereby be detected by the optical detector 44 at its intended output port and will not be detected at an optical detector 44 at any other output port. The optical link 30 can have up to −30 dB, which would result in an optical power of −27 dBm for a red second optical signal routed via red port 54d, 46d, without affecting the operation of the optical network 50.

Figure 6:
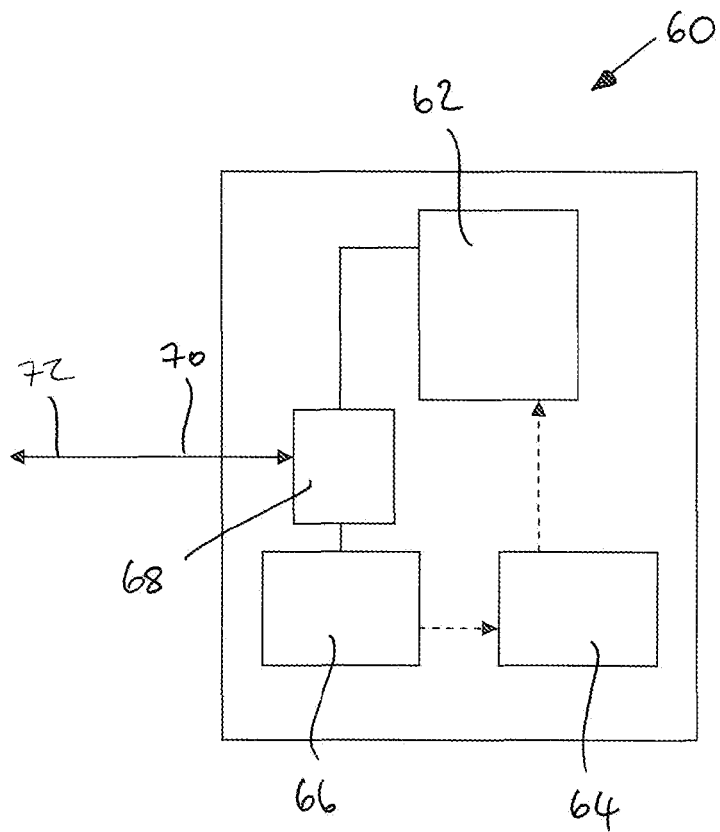
FIG. 6 is a schematic representation of an optical network element according to a fourth embodiment of the invention.

A fourth embodiment of the invention provides an optical network element 60, as shown in FIG. 6. The optical network element 60 comprises an optical transmitter 62, a controller 64, an optical receiver 66 and a band-split filter 68.

The optical transmitter 62 is arranged to generate and transmit a first optical signal 70. The controller 64 is arranged to control the optical transmitter to generate and transmit the first optical signal at a wavelength selected from a pre-determined plurality of wavelengths. The wavelengths correspond to the wavelengths of optical channels of an optical network in which the optical network element 60 is intended to be incorporated.

The optical receiver 66 is arranged to detect a second optical signal 72, routed to the optical receiver 66 via the band-split filter 68.

The controller 64 is arranged to control the optical transmitter 62 to generate and transmit the first optical signal 70 in response to no second optical signal being detected. The controller 64 is arranged to control the optical transmitter 62 to iteratively generate and transmit the first optical signal at different wavelengths of the plurality of wavelengths until the second optical signal is detected. The controller 64 is arranged to subsequently maintain generation and transmission of the first optical signal at the wavelength at which the second optical signal 72 is detected.

The controller 64 is arranged to control the optical transmitter 62 to generate and transmit the first optical signal in response to no second optical signal being detected. That is to say, the controller 64 controls the first optical transmitter 62 to generate and transmit the first optical signal when no second optical signal is detected by the optical receiver 66. The controller 64 is arranged to iteratively generate and transmit the first optical signal at different wavelengths of the plurality of wavelengths until the second optical signal is detected at the optical receiver 66. During a period where the second optical signal is not detected at the optical receiver 66, the controller 64 therefore controls the optical transmitter 62 to generate and transmit a first optical signal at a first wavelength of the pre-determined plurality of wavelengths. The optical transmitter 62 continues to generate and transmit the first optical signal at the first selected wavelength for a time period long enough to allow a second optical signal to be received at the optical detector 66.

Following the lapse of the required time period, if a second optical signal is not detected by the optical receiver 66 then the controller 64 controls the optical transmitter 62 to generate and transmit the first optical signal at a second wavelength of the pre-determined plurality of wavelengths. The controller 64 iteratively controls the optical transmitter 62 to generate and transmit the first optical signal at different ones of the pre-determined plurality of wavelengths until a second optical signal is detected.

The controller 64 is further arranged to subsequently maintain generation and transmission of the first optical signal at the wavelength at which the second optical signal is ultimately detected.

The optical network element 60 is thus arranged to configure the wavelength of the optical transmitter 62 by iteratively generating and transmitting at each of a pre-determined plurality of wavelengths until a second optical signal is detected. Detection of the second optical signal by the optical receiver 66 causes the controller 64 to maintain generation and transmission of the first optical signal at the last attempted wavelength.

The optical network element 60 is thus arranged to configure the wavelength of the optical transmitter 62 based simply on the detection of the second optical signal. The configuration of the wavelength of the optical transmitter 62 can thus be controlled at the physical layer of an optical network in which the optical network element 60 is incorporated, and is independent of the transmission protocol, standard and bit rate used by the network.

Figure 7:
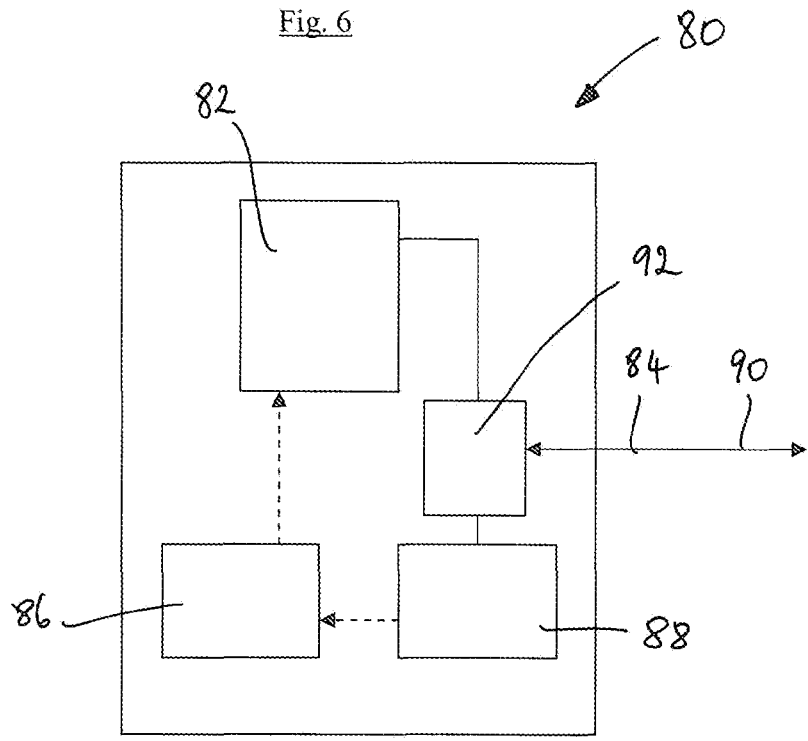
FIG. 7 is a schematic representation of an optical line termination according to a fifth embodiment of the invention.

Referring to FIG. 7, a fifth embodiment of the invention provides an optical line termination (OLT) 80 comprising an optical transmitter 82, a controller 86, optical receiver apparatus 88 and a band-split filter 92.

The optical transmitter 82 is arranged to generate and transmit a second optical signal 84. The optical receiver apparatus 88 is arranged to detect a first optical signal 90 having a wavelength within a receiving wavelength band. The controller 86 is arranged to control the optical transmitter to generate and transmit the second optical signal following detection of the first optical signal by the optical receiver apparatus 88.

The receiving wavelength band of the optical receiver apparatus 88 covers a pre-determined range of wavelengths and typically will include the wavelengths of a single channel of an optical network in which the OLT 80 is intended to be incorporated.

The optical transmitter 82 will only generate and transmit the second optical signal following detection of the first optical signal, thereby controlling power consumption of the OLT 80.

Figure 8:
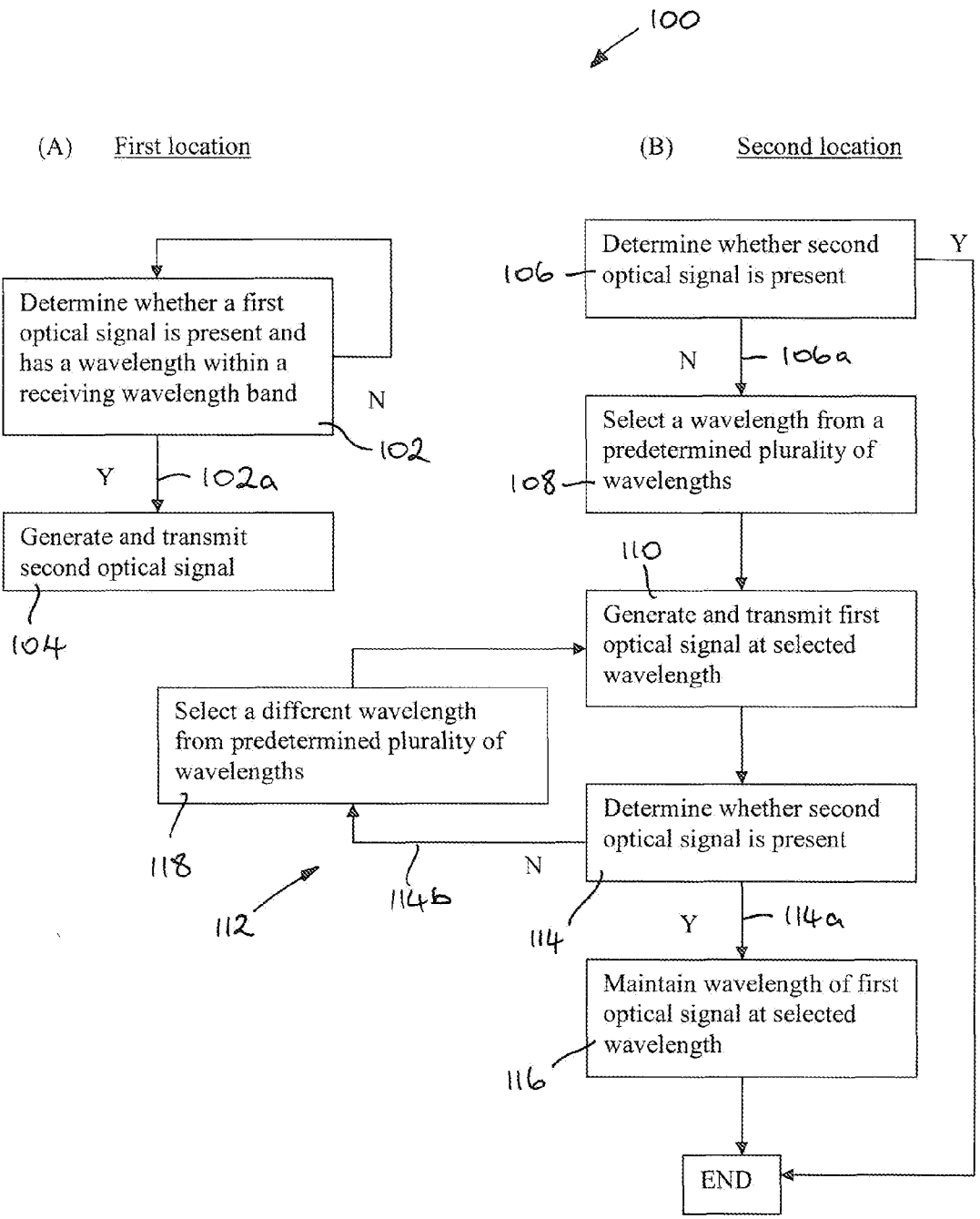
FIG. 8 is a flow chart of the steps of a method of setting a wavelength of an optical transmitter in an optical network according to a sixth embodiment of the invention.

A sixth embodiment of the invention provides a method 100 of configuring an optical transmitter in an optical network, as illustrated in the method steps of FIG. 8. The method 100 is suitable for use with any of the optical networks 10, 40, 50 described above.

The method comprises, at a first network location, A, determining whether a first optical signal is present and has a wavelength within a receiving wavelength band 102. If a first optical signal is present and has a wavelength within the receiving wavelength band 102, the method then comprises generating and transmitting a second optical signal 104.

The method further comprises, at a second network location, B, at which the optical transmitter to be configured is located, iteratively generating and transmitting the first optical signal at different wavelengths of a pre-determined plurality of wavelengths until the second optical signal is determined to be present. In more detail, the method comprises determining whether a second optical signal is present 106, and if the second optical signal is not present 106a, selecting a wavelength from a pre-determined plurality of wavelengths 108 and generating and transmitting a first optical signal at the selected wavelength 110. Following generation and transmission of the first optical signal, the method further comprises allowing a suitable time delay to elapse to allow transmission of the first optical signal and receipt of any resulting second optical signal, and determining whether a second optical signal is present 114. If a second optical signal is present 114a, the method then comprises maintaining generation and transmission of the first optical signal at the selected wavelength 116. If the second optical signal is not present 114b, the method comprises selecting a different wavelength from the pre-determined plurality of wavelengths 118, and generating and transmitting the first optical signal at the next selected wavelength 110. Again, following elapse of the required delay, the method then comprises determining whether a second optical signal is present 114. The steps of determining whether a second optical signal is present 114, selecting a different wavelength 118 and generating and transmitting the first optical signal 110 are repeated until a second optical signal is determined to be present 114a.

Figure 9:
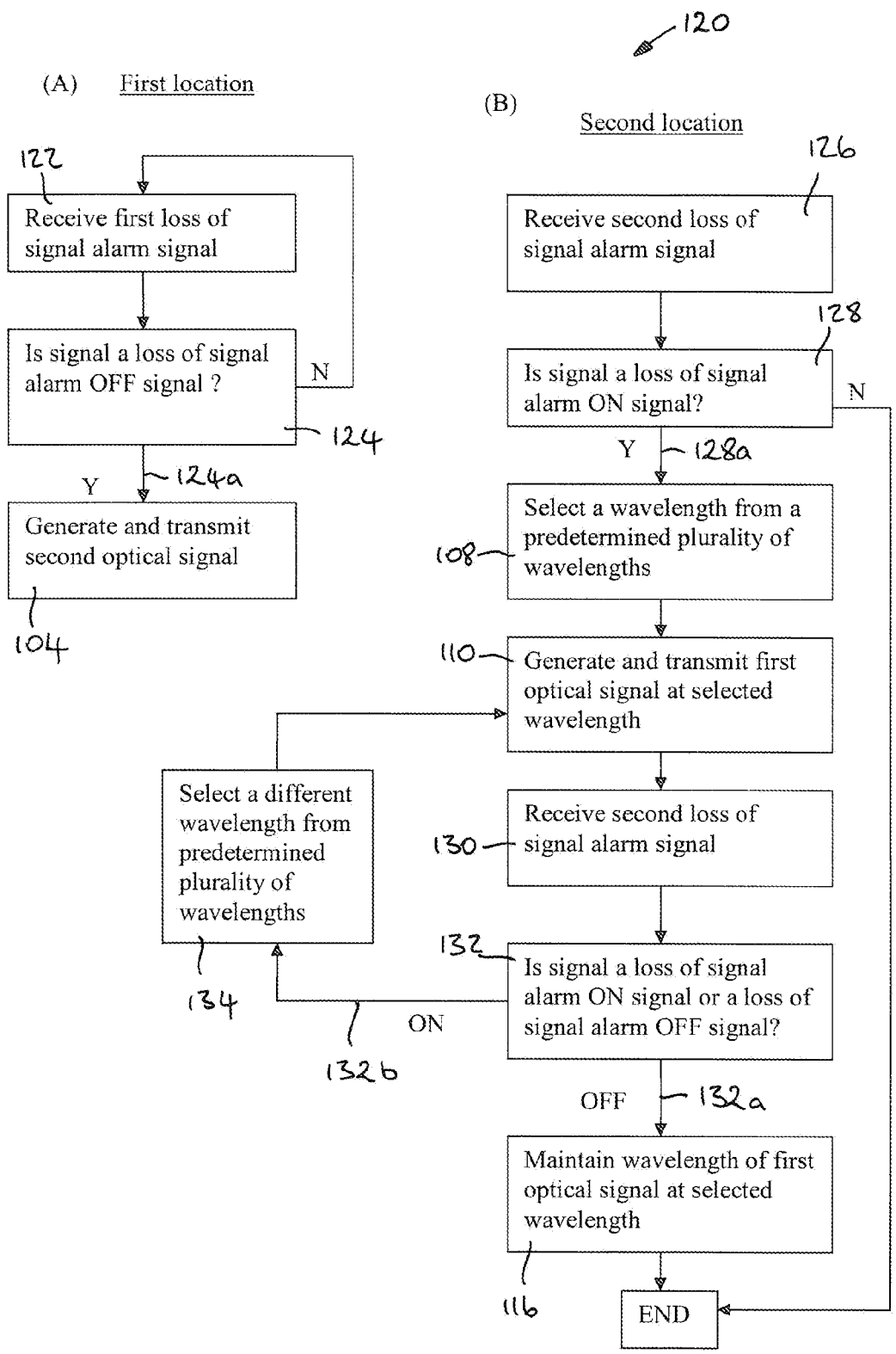
FIG. 9 is a flow chart of the steps of a method of setting a wavelength of an optical transmitter in an optical network according to a sixth embodiment of the invention.

Referring to FIG. 9, a seventh embodiment of the invention provides a method 120 of configuring an optical transmitter in an optical network. The method 120 is substantially the same as the method 100 of the previous embodiment, with the following modifications. The same reference numbers are retained for corresponding steps.

The method 120 comprises, at a first location, A, receiving a first loss of signal alarm signal 122 and determining whether the loss of signal alarm is a loss of signal alarm OFF signal 124 indicative that a first optical signal is present, i.e. that a first optical signal is detected. If the loss of signal alarm signal is a loss of signal alarm OFF signal 124a the method comprises generating and transmitting a second optical signal 104.

The method 120 further comprises, at a second location, B, receiving a second loss of signal alarm signal 126 and determining whether the second loss of signal alarm signal is a loss of signal alarm ON signal 128, indicative that a second optical signal is not present, i.e. that no second optical signal is detected. If so 128a, the method 120 comprises iteratively generating and transmitting the first optical signal at different wavelengths of the pre-determined plurality of wavelengths until a loss of signal alarm signal is received which is a loss of signal alarm OFF signal 132a, indicative that a second optical signal is present, i.e. that a second optical signal is detected. The method 120 further comprises maintaining generation and transmission of the first optical signal at the selected wavelength 116.

In more detail, the method 120 comprises selecting a first wavelength from the pre-determined plurality of wavelengths 108 and generating and transmitting the first optical signal at the selected wavelength 110. The method 120 further comprises receiving a second loss of signal alarm signal 130 and determining whether it is a loss of signal alarm ON signal or a loss of signal alarm OFF signal 132. If a loss of signal alarm ON signal is received 132b, the method 120 comprises selecting a different wavelength from the pre-determined plurality of wavelengths 134 and generating and transmitting the first optical signal at the new selected wavelength 110. A further second loss of signal alarm is received 130 and it is determined whether it is a loss of signal alarm ON signal or a loss of signal alarm OFF signal 132, as described above. The steps of selecting a different wavelength 134, generating and transmitting a first optical signal 110, receiving a second loss of signal alarm 130 and determining whether the second loss of signal alarm is an ON signal or an OFF signal 132 are repeated until a loss of signal alarm OFF signal 132a is received.

Figure 10:
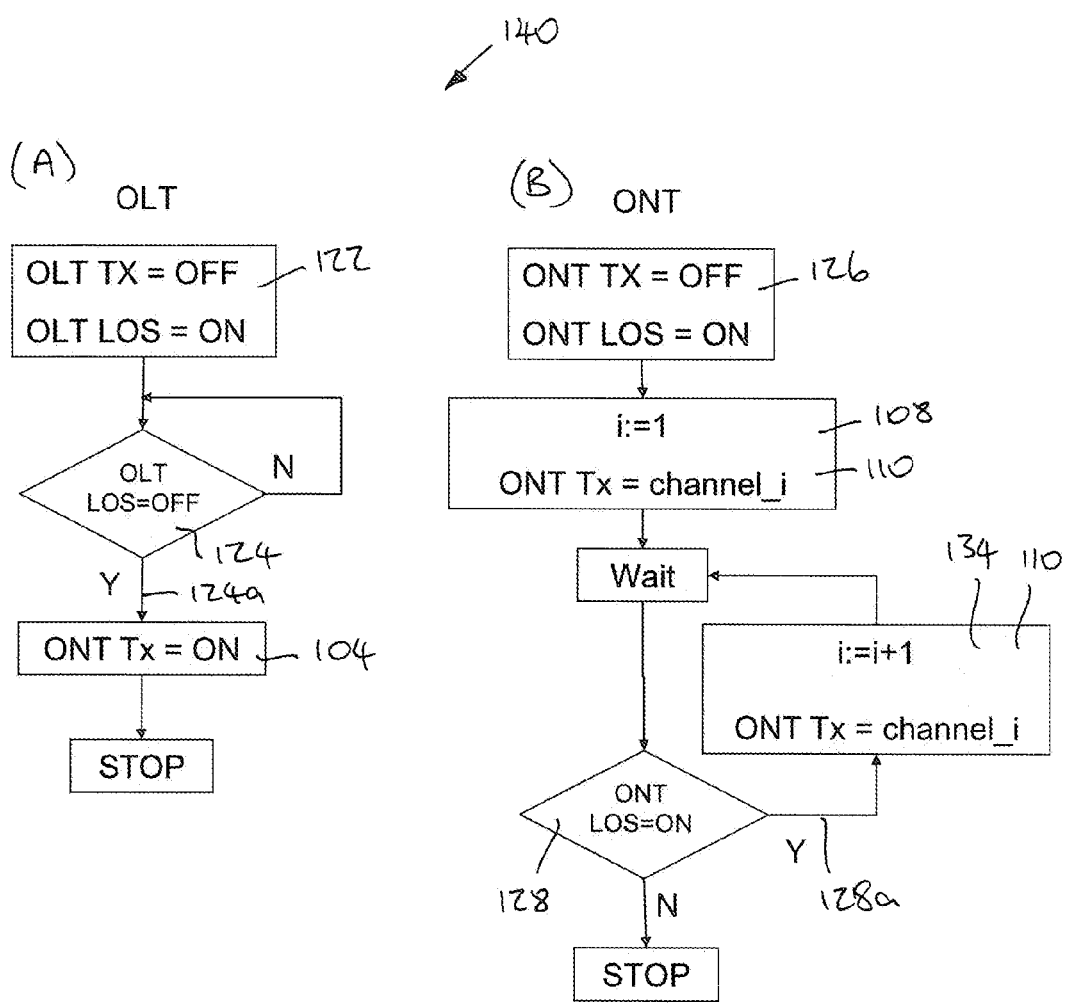
FIG. 10 is a flow chart of the steps of a method of setting a wavelength of an optical transmitter in an optical network according to a seventh embodiment of the invention.

FIG. 10 shows the steps of a method 140 of configuring an optical transmitter in an optical network according to a seventh embodiment of the invention. The steps of the method 140 are the same as the steps of the method 120 and the same reference numbers are retained.

The method 140 is specifically for configuring an optical transmitter at an optical network termination (ONT) (location B) in an optical network comprising an optical line termination (OLT) (location A).

Figure 11:
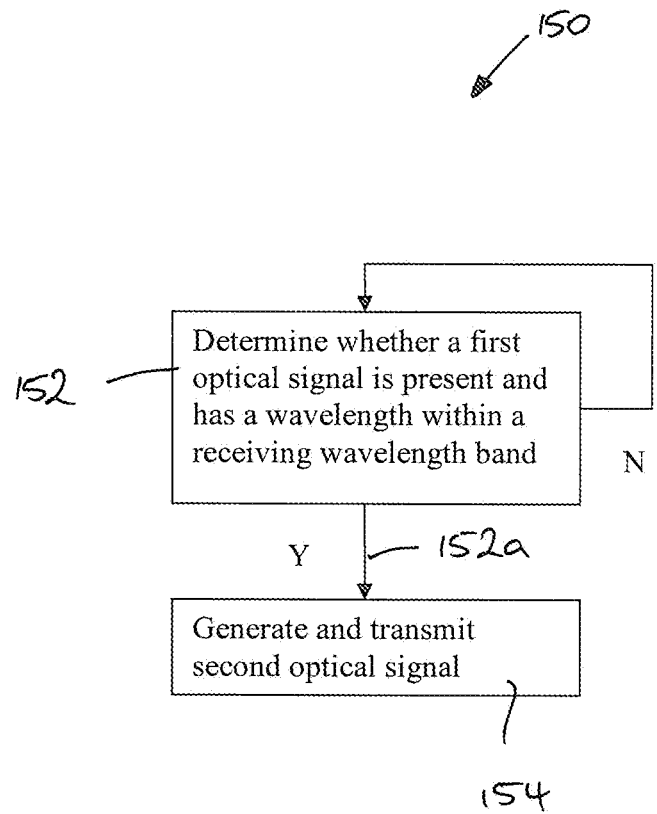
FIG. 11 is a flow chart of the steps of a method of remotely setting a wavelength of an optical transmitter in an optical network according to an eighth embodiment of the invention.

An eighth embodiment of the invention provides a method 150 of remotely setting a wavelength of an optical transmitter in an optical network, as shown in FIG. 11.

The method 150 comprises, at a location remote from the optical transmitter, determining whether a first optical signal generated by the optical transmitter is present and has a wavelength within a receiving wavelength band 152. The method 150 further comprises, when the first optical signal is present and has a wavelength within the receiving wavelength band 152a, generating and transmitting a second optical signal 154.

The invention claimed is:

1. An optical network, comprising:
an optical network element;
a second optical transmitter;
a second controller; and
an optical receiver apparatus,
wherein said optical network element comprises:
a first optical transmitter arranged to generate and transmit a first optical signal,
a first controller arranged to control said first optical transmitter to generate and transmit said first optical signal at a wavelength selected from a predetermined plurality of wavelengths, and
an optical receiver arranged to detect a second optical signal;
wherein said second optical transmitter is arranged to generate and transmit said second optical signal,
wherein said second controller is arranged to control said second optical transmitter to generate and transmit said second optical signal,
wherein said optical receiver apparatus is arranged to detect an optical signal having a wavelength within a receiving wavelength band,
wherein said first controller is configured to
control said first optical transmitter to generate and transmit said first optical signal in response to said second optical signal not being detected,
control said first optical transmitter to iteratively generate and transmit said first optical signal at different wavelengths among said plurality of wavelengths while the optical receiver remains configured to detect the second optical signal at the same wavelength in each iteration, until said second optical signal is detected at the optical receiver with power greater than a threshold optical power, and
in response to a determination that the second optical signal is received at the optical receiver with power greater than the threshold optical power, subsequently maintain generation and transmission of said first optical signal at said wavelength at which said second optical signal is detected, and
wherein said second controller is arranged to control said second optical transmitter to generate and transmit said second optical signal following a detection of said first optical signal by said optical receiver apparatus.

2. The optical network as claimed in claim 1, wherein said optical receiver does not detect optical signals having an optical power below the threshold optical power and is provided with a first loss of signal alarm arranged to generate a first loss of signal alarm ON signal when said second optical signal is not detected, said second optical signal not being detected when said second optical signal is received and has an optical power below said threshold optical power or when no second optical signal is received, and
wherein said first controller is arranged to receive said first loss of signal alarm ON signal and control said first optical transmitter to generate and transmit said first optical signal in response to receiving said first loss of signal alarm ON signal.

3. The optical network as claimed in claim 2, wherein said first loss of signal alarm is further arranged to generate a first loss of signal alarm OFF signal when said second optical signal is detected, said second optical signal being detected when said second optical signal is received and has an optical power at or above said threshold optical power, and
wherein said first controller is arranged to
control said first optical transmitter to iteratively generate and transmit said first optical signal at said different wavelengths of said plurality of wavelengths until said first loss of signal alarm OFF signal is received, and
subsequently maintain generation and transmission of said first optical signal at said wavelength at which said first loss of signal alarm OFF signal is received.

4. The optical network as claimed in claim 1,
wherein said optical receiver apparatus does not detect optical signals having an optical power below said threshold optical power, and is provided with a second loss of signal alarm arranged to generate a second loss of signal alarm OFF signal when said first optical signal is detected, said first optical signal being detected when said first optical signal is received and has an optical power at or above said threshold optical power, and
wherein said second controller is arranged to receive said second loss of signal alarm OFF signal, and control said second optical transmitter to generate and transmit said second optical signal in response to receiving said second loss of signal alarm OFF signal.

5. The optical network as claimed in claim 1, wherein said optical receiver apparatus comprises an optical detector coupled to an output port of a wavelength selective router.

6. The optical network as claimed in claim 5, wherein said optical detector has a sensitivity threshold which is higher than a maximum adjacent crosstalk of said output port.

7. The optical network as claimed in claim 6, wherein said first optical transmitter is arranged to generate and transmit said first optical signal having an optical power which is not greater than a difference between said sensitivity threshold and an attenuation experienced by said first optical signal on transmission across said network.

8. The optical network as claimed in claim 1, wherein said first controller is arranged to control said first optical transmitter to initially transmit the first optical signal prior to said optical receiver performing any optical signal detection.

9. The optical network as claimed in claim 1, wherein a wavelength of said second optical signal is not selected by said optical network element.

10. An optical network element, comprising:
an optical transmitter arranged to generate and transmit a first optical signal;
a controller arranged to control said optical transmitter to generate and transmit said first optical signal at a wavelength selected from a predetermined plurality of wavelengths; and
an optical receiver arranged to detect a second optical signal,
wherein said controller is arranged to
control said optical transmitter to generate and transmit said first optical signal in response said second optical signal not being detected,
control said optical transmitter to iteratively generate and transmit said first optical signal at different wavelengths among said plurality of wavelengths while the optical receiver remains configured to detect the second optical signal at the same wavelength in each iteration, until said second optical signal is detected at the optical receiver with power greater than a threshold optical power, and
in response to a determination that the second optical signal is received at the optical receiver with power greater than the threshold optical power, subsequently maintain generation and transmission of said first optical signal at said wavelength at which said second optical signal is detected.

11. The optical network as claimed in claim 10, wherein said controller is arranged to control said optical transmitter to initially transmit the first optical signal prior to said optical receiver performing any optical signal detection.

12. The optical network element as claimed in claim 10, wherein a wavelength of said second optical signal is not selected by said optical network element.

13. A method of configuring an optical transmitter in an optical network, the method comprising:
at a first network location remote from said optical transmitter, determining whether a first optical signal is present and has a wavelength within a receiving wavelength band, and when said first optical signal is present and has a wavelength within said receiving wavelength band, generating and transmitting a second optical signal; and
at a second network location, at which said optical transmitter is located, iteratively generating and transmitting said first optical signal at different wavelengths among a predetermined plurality of wavelengths while the second optical signal remains at the same wavelength in each iteration, and detecting in each iteration whether said second optical signal is present at an optical receiver with power greater than a threshold optical power, and in response to a detecting that the second optical signal is present at the optical receiver with power greater than the threshold optical power, subsequently maintaining generation and transmission of said first optical signal at said wavelength at which said second optical signal is so determined to be present.

14. The method as claimed in claim 13, wherein said step of determining whether said first optical signal is present and has said wavelength within said receiving wavelength band comprises:
receiving a first loss of signal alarm signal; and
determining that said first optical signal is present and has said optical power at or above said threshold optical power when said first loss of signal alarm signal is a loss of signal alarm OFF signal.

15. The method as claimed in claim 13, wherein said step of determining whether said second optical signal is present comprises:
receiving a second loss of signal alarm signal; and
determining that said second optical signal is not present when said second loss of signal alarm signal is a loss of signal alarm ON signal.

16. The method as claimed in claim 15, wherein said step of determining whether said second optical signal is present further comprises determining that said second optical signal is present when said second loss of signal alarm signal is a loss of signal alarm OFF signal.

17. The method as claimed in claim 13, wherein said first optical signal is determined as being present when said first optical signal is received and has an optical power equal to or greater then a detector sensitivity threshold.

18. The method as claimed in claim 17, wherein said second optical signal is transmitted with an optical power which is not greater than the difference between said detector sensitivity threshold and an attenuation experienced by said second optical signal on transmission across said network.

19. The method as claimed in claim 13, wherein an initial transmission of the first optical signal from the second network location is performed prior to performing any optical signal detection being performed at the second network location.

20. The method as claimed in claim 13, wherein a wavelength of said second optical signal is not selected at said second network location.

21. A configuration method performed by an optical network unit (ONU) of an optical network, the ONU being optically connected to an optical line termination (OLT) over an optical link, the method comprising:
transmitting, from the ONU, an uplink optical signal to the OLT, the uplink optical signal being an optical signal, and a wavelength of the uplink optical signal being selected from a plurality of wavelengths;
subsequent to transmitting the uplink optical signal to the OLT, determining, at the ONU, whether a downlink optical signal is present on the optical link with power greater than a threshold optical power, the downlink optical signal being an optical signal transmitted from the OLT; and
in response to determining that the downlink optical signal is present on the optical link with power greater than the threshold optical power, continuing to transmit, from the ONU, the uplink optical signal at the selected wavelength to the OLT; and
in response to determining that the downlink optical signal is not present on the optical link with power greater than the threshold optical power, iterating through the step of transmitting the uplink optical signal to the OLT and the step of determining whether the downlink optical signal is present on the optical link with power greater than the threshold optical power until it is determined that that the downlink optical signal is present on the optical link with power greater than the threshold optical power,
wherein in the step of transmitting the uplink optical signal to the OLT, a different wavelength among the plurality of wavelengths is selected in each iteration, and
wherein in the step of determining whether the downlink optical signal is present on the optical link, sensing of the downlink optical signal is performed with respect to the same wavelength in each iteration.

22. The method as claimed in claim 21, wherein a prior knowledge of a correspondence between the downlink optical signal and a correct wavelength of the uplink optical signal is not necessary at the ONU prior to initially transmitting the uplink optical signal from the ONU.

23. The method of claim 21, wherein a wavelength of the downlink optical signal is not selected by the ONU.

* * * * *